(12) United States Patent
Marks et al.

(10) Patent No.: US 6,453,695 B1
(45) Date of Patent: Sep. 24, 2002

(54) DUAL LENGTH INLET RESONATOR

(75) Inventors: Patrick C. Marks, Minoa; Thomas S. Katra, Fayetteville, both of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/050,230

(22) Filed: Jan. 18, 2002

(51) Int. Cl.[7] ............................................. F25B 27/00
(52) U.S. Cl. ......................................... 62/323.1; 62/296
(58) Field of Search .............................. 62/323.1, 296; 181/182, 185, 198, 204

(56) References Cited

U.S. PATENT DOCUMENTS

| | | | | |
|---|---|---|---|---|
| 3,779,339 A | * | 12/1973 | Johnson | 181/48 |
| 5,014,816 A | * | 5/1991 | Dear et al. | 181/229 |
| 5,096,010 A | * | 3/1992 | Ojala et al. | 180/68.3 |
| 5,996,733 A | * | 12/1999 | De Tuncq et al. | 181/250 |
| 6,009,705 A | | 1/2000 | Arnott et al. | |
| 6,332,442 B1 | * | 12/2001 | Komada et al. | 123/184.55 |

* cited by examiner

Primary Examiner—William C. Doerrler
Assistant Examiner—Melvin Jones

(57) ABSTRACT

The tunable resonator is coupled to the engine speed control such that the resonator is set to a different frequency range when the engine speed is changed. The frequency range is, changed to a higher frequency by closing a valve which effectively reduces the length of the resonator.

4 Claims, 2 Drawing Sheets

DUAL LENGTH INLET RESONATOR

BACKGROUND OF THE INVENTION

Diesel engines used to drive transport refrigeration equipment produce low frequency tones at their firing frequencies and their harmonics. The refrigeration units can be required to hold the load temperature within 0.1 F.° of the set point which may be 40° F. for flowers or produce and −20° F. for ice cream. A number of these units can be parked and running at cold storage warehouses, interstate highway rest stops, etc. Because these units can be running at various loadings and because the engine speeds of the units are operator adjustable by a couple of percent, the noise outputs will be at different frequencies, but may be relatively coherent such that the various different frequency noise sources cyclically go into and out of phase. As the noise sources go from reinforcing to opposing the other noise sources, there is a perceived varying of the sound level. These tones can be sources of annoyance in the community adjacent areas where a number of units are running.

U.S. Pat. No. 6,009,705 discloses a noise attenuator employing a plurality of quarter wave resonator tubes and Helmholtz resonators. Each will be tuned to a separate narrow frequency range. The effectiveness of the various resonators will drop off as the frequencies of the noise sources vary from the design frequencies as the engine speed/load changes.

SUMMARY OF THE INVENTION

A transport refrigeration unit is, typically, driven by a diesel engine. As is conventional for internal combustion engines, ambient air is drawn through a filter into the cylinders of the engine. Rather than connecting one or more attenuators effective over single narrow ranges, the present invention employs an adjustable resonator in an elbowed side branch. Within the resonator is a butterfly or flapper valve that is either fully open or closed. At low engine speed, the valve is open and the sound energy from the engine enters the resonator and is reflected back on itself, 180° out of phase. The distance between the closed end of the side branch and the inlet pipe is $\lambda_1/4$, where $\lambda_1$ is the wavelength of the tone of interest in the inlet pipe during low speed operation of the engine. At high speed, the valve is closed and the resonator is tuned to the higher engine speed, with the distance between the inlet pipe and the closed valve being $\lambda_2/4$, where $\lambda_2$ is the wavelength of the tone of interest in the inlet pipe during high speed operation of the engine. The valve is connected to the engine speed control such that the valve is positioned in accordance with the engine speed of a two speed engine.

It is an object of this invention to eliminate the need for a resonator for each frequency of interest at both high and low speed operation.

It is another object of this invention to provide a resonator effective in two frequency ranges. These objects, and others as will become apparent hereinafter, are accomplished by the present invention.

Basically, the tunable resonator is coupled to the engine speed control such that the resonator is set to a different frequency range when the engine speed is changed. The frequency range is changed to a higher frequency by closing a valve which effectively reduces the length of the resonator.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
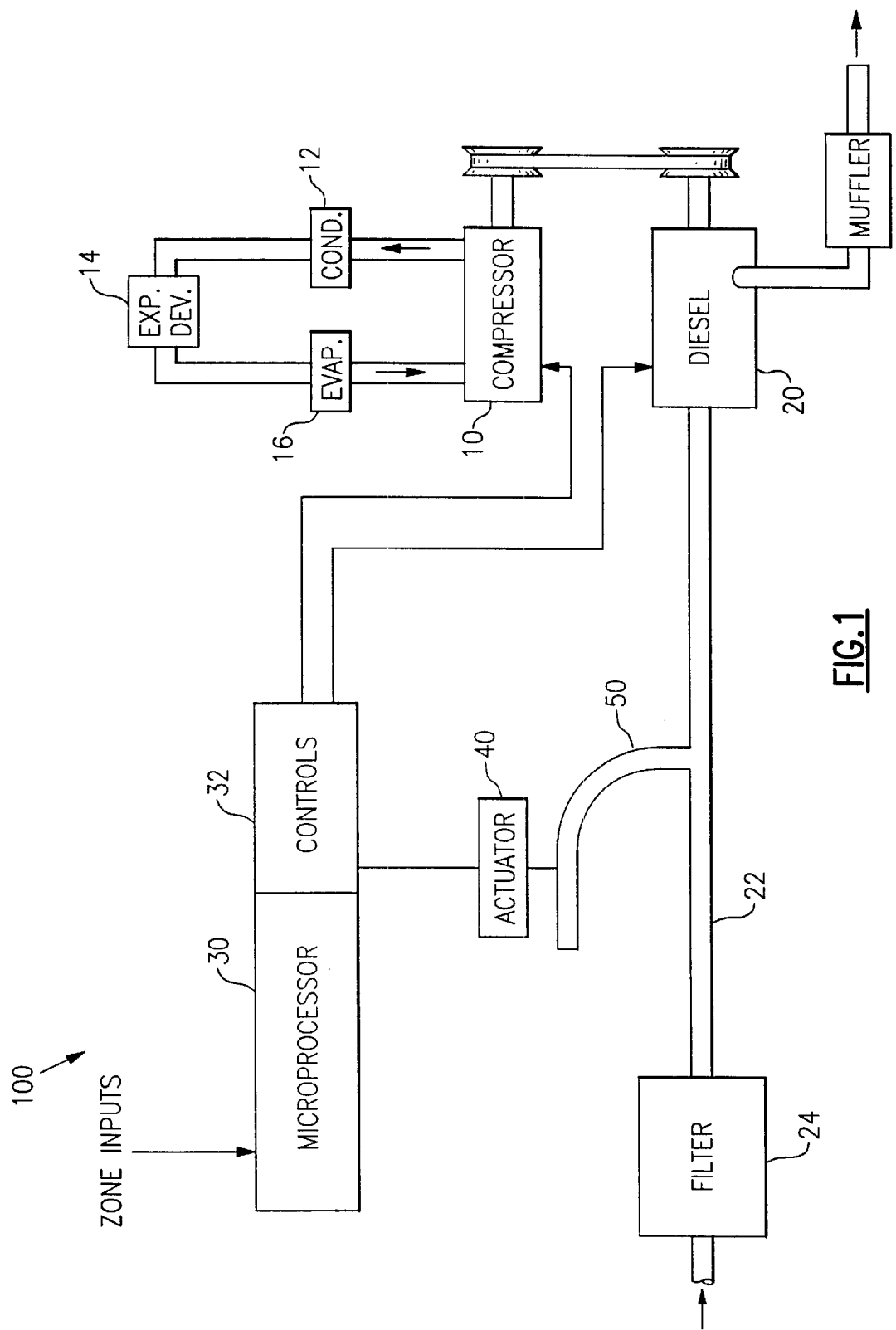
FIG. 1 is a schematic representation of the present invention as used with a diesel engine driven refrigeration system.

In FIG. 1, the numeral 100 generally designates a transport refrigeration system. Refrigeration compressor 10 is driven by a multi-speed diesel engine 20. Compressor 10 is in a refrigeration circuit serially including condenser 12, expansion device 14 and evaporator 16. Refrigeration system 100 is controlled by microprocessor 30 which receives a number of inputs such as the engine speed, the sensed ambient temperature, condenser entering air temperature, zone temperature, and zone set point which are collectively labeled as zone inputs. In operation, diesel engine 20 and compressor 10 are driven through controls 32 responsive to microprocessor 30. Specifically, diesel engine 20 may be driven through a speed control solenoid and draw ambient air into its cylinders via inlet line 22 containing filter 24.

Figure 2:
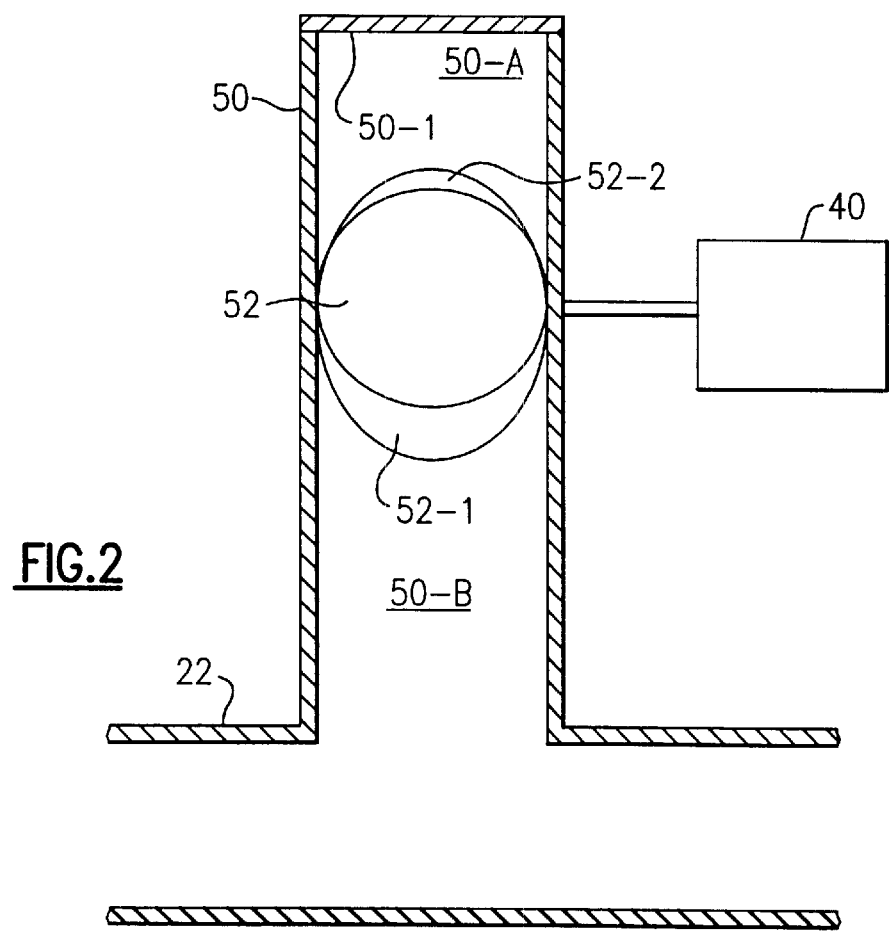
FIG. 2 is a sectional view of the side branch resonator of FIG. 1 with the valve in the open position.
Figure 3:
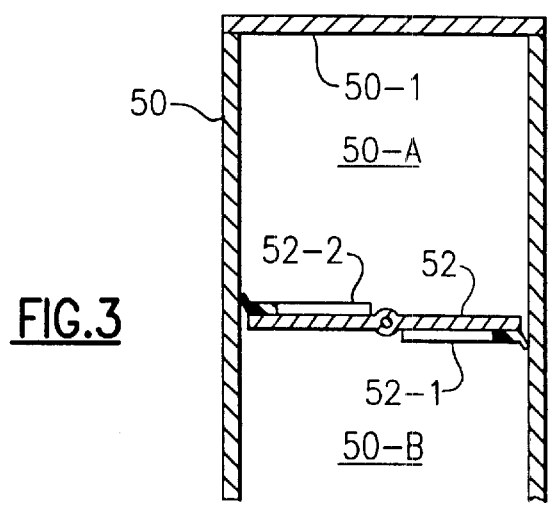
FIG. 3 is a sectional view of the side branch resonator of FIG. 1, rotated 90° with respect to FIG. 2 and showing the valve in the closed position.

The present invention provides an elbowed side branch resonator 50 containing a butterfly or flapper valve 52 driven by actuator 40 which is coupled to the controls 32. Although resonator 50 is illustrated as having a gradual curve, it may be a tee such that it is straight and at 90° to inlet line 22. The specific application may dictate the shape of resonator 50, but no sudden directional change should be present. Referring specifically to FIGS. 2 and 3, valve 52 is specifically illustrated as a flapper valve. Although valve 52 appears to be circular and to have the same nominal dimension as the interior of resonator 50, it will have a slightly greater dimension in the direction perpendicular to the axis of rotation than along the axis of rotation. The purpose of this non-circular configuration is to ensure a positive seating since the valve 52 will be in an interference fit with the interior walls of side branch resonator 50. The interference can be from the valve itself and/or wiper lips 52-1 and 52-2 of a suitable material such as neoprene. If necessary, or desired, valve 52 could engage a seat located in resonator 50. Although member 52 is described as a valve, there is no fluid flow past the valve since it is in a closed line. Structurally, however, member 52 generally corresponds to a conventional butterfly or flapper valve. Actuator 40 places valve 52 in either the open or the closed position and may be any one of a number of suitable devices. Assuming that the pivot about which valve 52 rotates includes a crank external to resonator 50, then valve 52 can be positioned by a solenoid or any mechanism that could pull the crank in response to a control signal from controls 32 such as a linear motor, a vacuum actuator, or a rotary motor with another crank. Valve 52 may also be mounted on the shaft of a stepper motor which would be rotated 90° in alternating directions to open or close valve 52. If the actuator is only effective in one direction, valve 52 would be biased to the other position, as by a spring.

At low speed, valve 52 is in the open position of FIG. 2 and sound energy from diesel 20 enters the resonator 50 and is reflected back on itself, 180° out of phase. The distance between the end 50-1 of side branch resonator 50 and the inlet pipe 22 is $\lambda_1/4$, where $\lambda_1$ is the wavelength of the tone of interest in the inlet pipe 22 when diesel 20 is operating at low speed. At high speed, valve 52 is in the closed position of FIG. 3 which effectively divides resonator 50 into two chambers, 50-A and 50-B, respectively. Chamber 50-A is isolated from inlet pipe 22 which effectively shortens side branch resonator 50 so that resonator 50 is tuned to the higher engine speed with the distance between the inlet pipe 22 and the closed valve 52 being $\lambda_2/4$, where $\lambda_2$ is the wavelength of the higher frequency tone of interest in the inlet pipe 22 during high speed operation. Typical frequency ranges would be 50 Hz at low speed and 73 Hz at high speed with a typical $\lambda_1/4$ of 68 inches and an $\lambda_2/4$ of 46 inches, respectively.

As described above, side branch resonator 50 can be tuned to either high or low speed operation of diesel 20 and the present invention couples the tuning of resonator 50 to the speed control of diesel 20. Responsive to engine and zone inputs, microprocessor 30 controls the loading of compressor 10 and controls the speed of diesel 20 which is driving compressor 10 through controls 32. The speed of diesel 20 is controlled by a speed control solenoid, or any other suitable device, responsive to microprocessor 30. The speed control device 40 has two positions which correspond to high and low speed, respectively, of diesel 20. Diesel 20 and resonator 50 are coupled by microprocessor 30 and controls 32 such that changing the speed of diesel 20 produces a corresponding adjustment of resonator 50 to change the tuning.

From the point of view of acoustics, the system does not have to be tightly sealed as long as the leakage areas are very small compared to the active areas. As an inlet silencer, as illustrated, resonator 50 is located between filter 24 and diesel 20, thus it must be tight enough to prevent dirt leaking in and entering the engine 20 having bypassed filter 24. Typically o-ring type sealing for the actuator structure should be sufficient. Resonator 50 and valve 52 would be made of a material, such as steel or molded plastic, so as to provide a rigid wall for sound reflection.

Although the present invention has been illustrated and described in terms of a two speed diesel driven refrigeration system, the teachings of the present invention apply to reducing the inlet pulsations and can be used in any application where an engine runs at a modest number of fixed speeds such as a gas driven generator. The speeds must be far enough apart to permit plural valves which do not interfere with each other. Other changes will occur to those skilled in the art. It is therefore intended that the present invention is to be limited only by the scope of the appended claims.

What is claimed is:

1. A refrigeration system having a multi-speed engine with an inlet line connected to said engine, microprocessor means for controlling the speed of said engine, the improvement comprising:

a closed end side branch resonator connected to and open to said inlet line and having a length corresponding to one fourth the wavelength of a frequency of said engine when running at a low speed; and means for effectively changing the length of said closed end side branch to a length corresponding to one fourth the wavelength of a frequency of said engine when running at a speed higher than said low speed.

2. The improvement of claim 1 wherein:

said means for effectively changing the length of said closed end side branch is a valve spaced from said closed end and movable into a position sealing off a portion of said closed end side branch from said air inlet line.

3. In a system having a multi-speed engine with an air inlet line connected to said engine, side branch resonator structure comprising:

a closed end side branch connected to and open to said air inlet line and having a length corresponding to one fourth the wavelength of a frequency of said engine when running at a low speed; and means for effectively changing the length of said closed end side branch to a length corresponding to one fourth the wavelength of a frequency of said engine when running at a speed higher than said low speed.

4. The side branch resonator structure of claim 3 wherein:

said means for effectively changing the length of said closed end side branch is a valve spaced from said closed end and movable into a position sealing off a portion of said closed end side branch from said air inlet line.

\* \* \* \* \*